United States Patent [19]

Ewanus et al.

[11] 3,838,350

[45] Sept. 24, 1974

[54] DIFFERENTIAL ENCODED QUADRIPHASE DEMODULATOR

[75] Inventors: Walter Ewanus, Ellicott City; Donald B. McKone, Glen Burnie, both of Md.

[73] Assignee: Westinghouse Electric Corporation, Pittsburgh, Pa.

[22] Filed: Aug. 4, 1972

[21] Appl. No.: 277,933

[52] U.S. Cl. .................... 329/104, 325/320, 178/88, 329/122, 331/23

[51] Int. Cl. .................... H04l 27/22

[58] Field of Search ........ 329/50, 104, 122; 331/23, 331/25; 325/30, 320; 178/66, 88

[56] References Cited

UNITED STATES PATENTS

| | | | |
|---|---|---|---|
| 3,465,258 | 9/1969 | Wheatley | 329/122 |
| 3,525,945 | 8/1970 | Puente | 329/122 X |
| 3,537,017 | 10/1970 | Judge | 329/122 |
| 3,594,651 | 7/1971 | Wolejsza | 325/320 X |
| 3,617,889 | 11/1971 | Robinowitz | 178/66 X |
| 3,638,125 | 1/1972 | Goell | 329/104 X |
| 3,736,507 | 5/1973 | Wokjsza et al. | 325/30 |
| 3,753,114 | 8/1973 | Burley | 329/122 |

*Primary Examiner*—Alfred L. Brody

*Attorney, Agent, or Firm*—J. B. Hinson

[57] ABSTRACT

Coherent demodulation of differentially encoded quadriphase modulation is accomplished using initially a non-optimum passive delay line detector to derive a carrier component. The output of the delay line demodulator, comprising I and Q channel data of less than desirable error performance, is differentially encoded for correlation with the original quadriphase modulation resulting in reconstruction of the suppressed carrier frequency. The reconstructed carrier is supplied to a filter bank and frequency synthesizer for generating a synthesized carrier frequency. The synthesized frequency and the reconstructed carrier are supplied to a phase-lock loop which generates phase correction signals. The synthesized frequency is mixed with the original modulation and the resulting signal is supplied to coherent phase detectors, the latter also receiving the phase correction signals from the phase-lock-loop, and serving to optimally demodulate the quadriphase components, yielding I and Q data channels. Efficiency of demodulation is improved further by employing the phase detector acquired I and Q data for reconstruction of the carrier frequency, instead of the initial delay line demodulator source. Matched filter components, comprising bit synchronization and bit regeneration circuitry process the demodulator outputs and contribute accordingly to requirements for minimum error demodulation. Another measure of improved demodulation performance is afforded by weighted comparison of the redundant I and Q channels of data of the delay line demodulator and the coherent phase detectors.

19 Claims, 2 Drawing Figures

DIFFERENTIAL ENCODED QUADRIPHASE DEMODULATOR

BACKGROUND OF THE INVENTION

1. Field of the Invention

The invention relates to demodulation of differentially encoded quadriphase transmissions and is particularly suited to ultra-high-speed digital data communications.

2. State of the Prior Art

Requirements for ultra-high-speed digital data transmission (i.e., rates in excess of hundreds of megabits per second) have been established in the radio communications art. These requirements place tremendous burdens on spectrum space, requiring optimum utilization thereof. As a result, considerable attention has been given to quadriphase modulation, which requires only onehalf the bandwidth needed for biphase modulation for a given rate of data transmission. Furthermore, the communication system power margins are not excessive, e.g., they are limited by economical considerations, emphasizing the need for near optimum signal processing techniques.

In the latter regard, differentially encoded quadriphase, as distinguished from strict quadriphase, transmission typically is employed to transmit the four possible information words (each word consists of two binary bits) of quadriphase transmissions. Differentially encoded quadriphase transmits each word as a given increment in phase relative to the absolute phase of the preceding transmitted word, as opposed to strict quadriphase where each word is transmitted as a given absolute phase independent from all other transmitted words. Differentially encoded quadriphase is usually employed since the receiver only has to decode phase increments and does not have to resolve the ambiguity of absolute 0° phase.

A particular problem arising in the use of differntially encoded quadriphase transmission, however, is the design of the demodulation process. Optimum system performance is realized for reliable reception of transmitted data having a minimum ratio of signal energy to noise energy, $E/N_o$. To achieve optimum performance, coherent PSK (phase shift keyed) modulation is desired. At extremely high data rates, however, the classical demodulation processes for PSK signals are not readily mechanized, and those that are, typically do not afford optimum performance. Specifically, there are three basic demodulator approaches that are employed to demodulate differentially encoded quadriphase transmission. The techniques are: (1) delay line demodulation, (2) multiply demodulation, and (3) modified Costas demodulation. These techniques differ mainly in the method used to obtain a carrier reference from the suppressed carrier transmission with which to perform coherent quadrature detection.

A delay line demodulator is a differential detector that utilizes the preceding phase state as the coherent reference to detect the phase change between the preceding state and existing state (i.e., the transmitted word currently being received). This reference is obtained by passing a portion of the received signal through a delay line with a delay equal to the transmission word rate. The delayed signal is split into quadrature components and supplied to two wide band phase detectors to obtain detected I and Q (in-phase and quadrature) channels. The error performance of this demodulation technique in a given signal-to-noise environment is at least 2.5 dB worse than theoretical for a coherent detector because the reference used is a transmitted state and as such is a noisy reference. Such an error performance degradation cannot be tolerated in many systems and especially those where carrier-to-noise ratios are marginal. Hence, though readily implemented, the delay line demodulator does not afford satisfactory, and certainly not optimum, performance.

A multiply demodulator employs a coherent detector to detect transmitted information and as a result has the theoretical performance of a coherent detector. The coherent reference is obtained by effectively stripping the quadriphase modulation off a portion of the received signal by multiplying the received signal by itself an appropriate number of times. The multiplication effectively removes the quadriphase modulation and yields a clear carrier four times the frequency of the transmitted carrier [i.e., $\cos^4(\omega_o t + (n\pi/2)) = \cos(4\omega_o t + 2n\pi) = \cos 4\omega_o t$]. The resulting carrier is then tracked by a phase-lock-loop from which a coherent reference is derived at $\cos \omega_o t$ for the phase detectors. The multiplier demodulator, however, is not readily implemented in view of component feasibility. Specifically, the frequency multipliers must have adequate instantaneous bandwidth to pass the wide band modulation sideband (e.g., 100–200 MHz). The unavailability of such multipliers thus limits the use of the multiplying technique to systems employing relatively lower rate quadriphase modulation.

The modified Costas demodulator is also a coherent detector that yields near theoretical error performance. This technique does not remove modulation from the received signal to obtain a carrier for a phase-lock-loop to track; rather, an error signal is derived from the detected I and Q channel crosstalk. The reference oscillation from the tracking VCO (voltage controlled oscillator) is split into quadrature components by a 90° hybrid phase splitter and supplied to the two phase detectors for the I and Q channels, respectively. The respective phase detector outputs are the two channels of demodulated data — i.e., digital signals. These digital signals are amplified to provide detected data outputs, and reference and signal inputs for coherent amplitude detectors (CAD's). These CAD's provide corss multiplication of I and Q channels (modified Costas action) to obtain a measure of crosstalk between channels. This measure of the crosstalk is the error signal that drives the reference VCO. When the channel crosstalk is minimized, the frequency and phase of the reference VCO are correct for proper coherent demodulation. This technique, however, suffers from limitations as to component availability as in the multiply technique above, and thus is limited to lower data rates. Specifically, the video amplifiers and the coherent amplitude detectors are special components requiring wide instantaneous bandwidths and are not readily available at high data rates. The fact that an unmodulated carrier is never developed imposes restrictions on the nature of the frequency search which can be conducted, requiring longer acquistion time, and also requires use of a wideband energy detector for developing an AGC signal.

SUMMARY OF THE INVENTION

The invention incorporates within the circuitry of a conventional coherent demodulator a unique correlation circuit which derives the required carrier frequency and phase of a differentially encoded quadriphase transmission employing, characteristically, a suppressed carrier. As is well known in the art, near theoretical error performance, (i.e., minimum received signal energy relative to noise energy, E/No) is achieved for PSK (phase-shift-keyed) modulation under conditions of coherent detection. The received signal, however, does not exhibit within its spectral content the original carrier frequency, and therefore the proper frequency and phase of a reconstructed carrier must be derived solely from the intelligence modulation of the received signal. Without knowledge of the suppressed carrier frequency and phase, acquisition of the received signal in frequency and subsequent demodulation are extremely improbable.

The technique of the invention fulfills all requirements for reconstruction of the necessary carrier frequency and phase for achieving coherent demodulation. Once the carrier frequency is reconstructed and a synthesized carrier frequency is generated, coherent detection takes place under control of the phase-lock operation. The technique of the invention may be implemented with standard hardware elements, while achieving wideband operation, equivalent to bit rates in the hundreds of megabits per second range.

In general, and in accordance with the invention, signal demodulation is performed in a two-step procedure. Initially, a non-optimum form of demodulation is effected by a passive delay line detector providing initial quadriphase detection. A correlation process then is employed for reconstructing a carrier component from the suppressed carrier transmission. An efficient and rapid acquisition technique is provided for generating a synthesized carrier frequency in response to the reconstructed carrier, which synthesized carrier frequency then is mixed with the received transmission for supply to a coherent detector. A phase-lock-loop responds to both the synthesized and the reconstructed carrier signals to generate a reference carrier oscillation with necessary phase corrections, and which is supplied as well to the coherent detector, thereby to derive the I and Q channel data signals. Once coherent demodulation is established, the I and Q signals derived thereby are employed in the correlation function for reconstruction of the suppressed carrier, in the alternative to those from the delay line demodulator, improving the accuracy of the reconstructed carrier and thereby the efficiency of the coherent demodulation.

The delay line demodulator preferably derives directly from the received signal the I and Q channels of bit independent, data bit streams. Alternatively, bit dependent, i.e., differentially encoded, data bit streams may be provided by the delay line demodulator and, if desired, a differential decoder be provided to produce the bit independent data streams. The basic demodulation process may be performed in the usual manner by passing a portion of the received signal through a delay line with a time delay equivalent to the transmission word rate. The delayed signal is split into quadrature components and supplied to two wideband phase detectors to obtain detected I and Q (in-phase and quadrature) channels. Where bit independent I and Q data channel outputs are produced by the delay line demodulator, the detected information is differentially encoded again. In either case, bit dependent, i.e., differentially encoded, I and Q data channel signals, are thereby provided for driving a quadriphase modulator, which receives as an input the received signal. The quadriphase modulator functions to correlate received signal energy, resulting in the removal of modulation sidebands and reconstruction of the original carrier frequency. The amplitude of the reconstructed carrier is a measure of received signal strength and, through energy detection, is used to satisfy automatic gain control (AGC) requirements, and specifically to afford an AGC signal.

To account for potential uncertainties in the reconstructed carrier frequency arising, for example due to doppler shifting, a filter bank is employed to detect the bandpass within which the received signal is actually occurring, such that a precise frequency can be synthesized in proper phase relationship to the received quadriphase modulation. The filter bank employs a number of filters of displaced center frequencies and generally equal bandwidth. The reconstructed carrier is supplied to the filter bank and an output is derived from one of the filters. Suitable logic circuitry may identify the frequency, in accordance with center frequency of the filter providing the output, to control a frequency synthesizer. The synthesizer has a store of available frequency outputs, and produces a given one thereof as an output in accordance with the frequency of the reconstructed carrier, as identified by the filter bank and associated logic circuitry.

The synthesized frequency is mixed with the reconstructed carrier for supply to a phase-lock-loop which affords a phase correction output as well as an output indicating acquisition of the carrier frequency. The range of synthesized frequencies accordingly is selected such that the signal resulting from mixing of the synthesized and reconstructed carrier signals is within the bandwidth of the phase-lock-loop. The phase-lock-loop then locks on and tracks the correlated carrier, indicating acquisition as well as generating the phase corrections. The output of the phase-lock-loop may be characterized as a reference carrier signal, and which is operative with the synthesized frequency signal to establish a reference frequency which is coherent with the suppressed carrier of the received signal, and which affords coherent demodulation of the received signal for deriving the I and Q channels of data.

Associated with the operation of the phase detectors are circuits for integrate, sample and dump operations, bit synchronizing and bit regeneration. Taken together these circuits provide the required matched filter functions necessary to achieve near theoretical error performance in a given noise environment.

In closed loop operation, the I and Q channel signals, processed by the coherent phase detectors, are gated into the quadriphase modulator for carrier reconstruction, and the delay line demodulator I and Q signals are gated out. This gating function is controlled by the acquisition indication output of the phase-lock-loop and thus is effected automatically. Under these conditions the maximum signal to noise (S/N) and minimum error rate performance obtains. Additional enhancement of receiver error performance is made possible by properly combining the I and Q channel outputs of both the coherent phase detector and the delay line demodulator circuits, employing techniques of weighted averaging. To make the output signals compatible, the delay line demodulator has associated therewith circuits for integrate, sample and dump operations, bit synchronizing and bit regeneration, which may be identical to those of the phase detectors. The outputs of th component receiving I and Q channel information from the coherent phase detectors and the delay line demodulator, properly weighted, are the differentially decoded versions of transmitted I and Q data streams.

In summary, major advantages of the subject system include rapid acquisition, but with error performance approaching the theoretical limit. The reconstructed carrier afforded by the correlation technique provides narrow band AGC energy detection for AGC control. The redundant I and Q channel data produced by the system may be weighted and compared to achieve even improved error performance. All components of the system are readily available with adequate bandwidths for passing up to 200 MHz data and, specifically, no special components are required as in prior art techniques.

The above and other features of the invention will be better understood from the following detailed description of the invention taken in connection with the accompanying drawings.

DETAILED DESCRIPTION OF THE INVENTION

Figure 1:
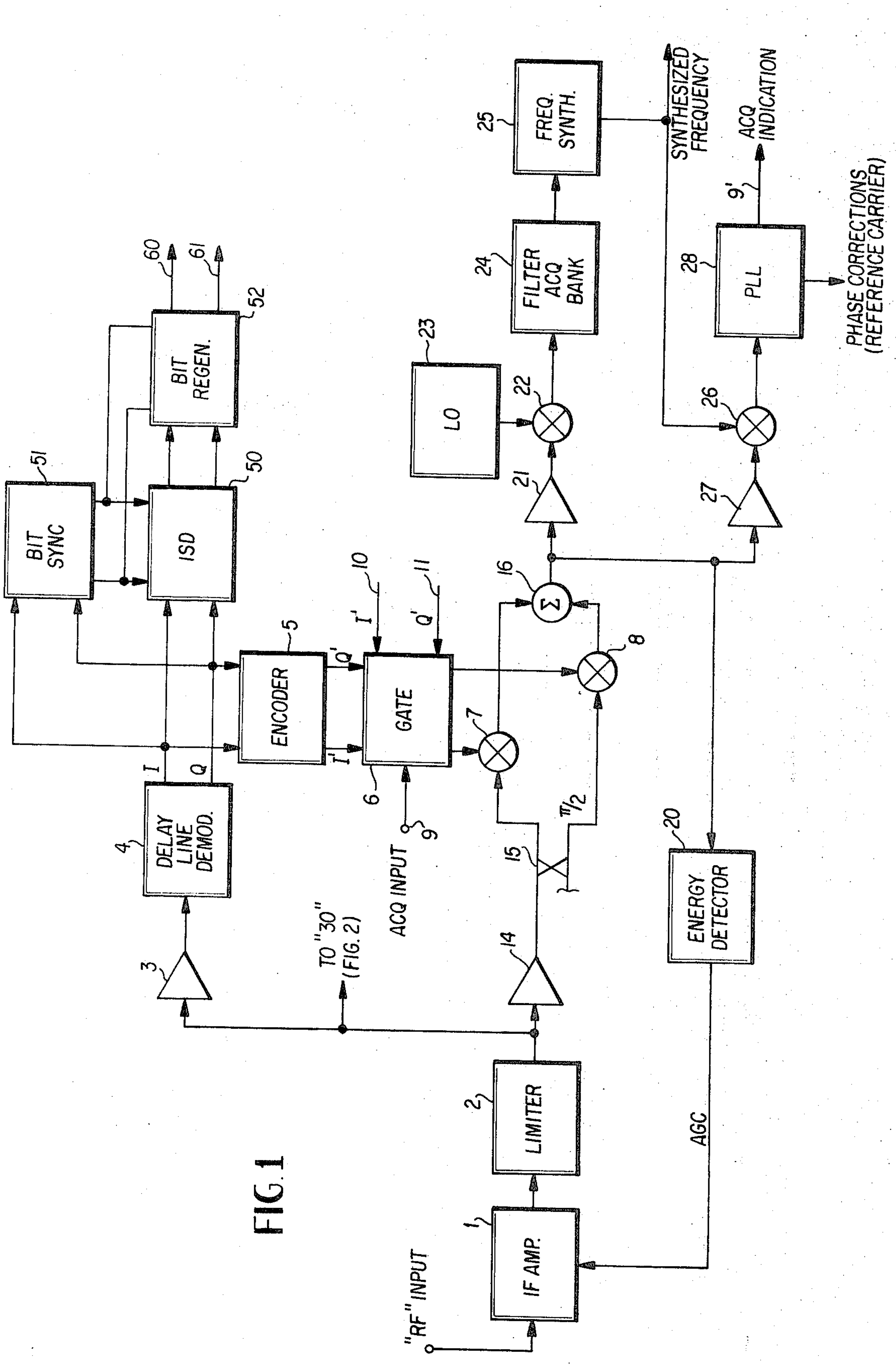
FIG. 1 is a block diagram of a portion of the differentially encoded quadriphase demodulator of the invention, and including generally the delay line demodulator and associated means for reconstructing the carrier and for acquiring the frequency and phase of the reconstructed carrier.

Referring to FIG. 1, a differentially encoded signal, comprising I and Q channels of intelligence modulation at RF frequencies, is made input to IF amplifier 1. The IF amplifier 1 is of suitable design to properly amplify wideband modulation and to adjust its gain as a function of an AGC (Automatic Gain Control) voltage which is supplied, as discussed subsequently. A limiter stage 2 recieves the output of IF amplifier 1 and provides a relatively constant amplitude signal, varying according to PSK (phase-shift-keying) modulation, as the "received" signal for subsequent processing. Specifically, the output of limiter 2 is made input to three distinct circuits. The first circuit is a delay line demodulator comprising a buffer amplifier 3 and a delay line demodulator component 4. In actuality as anyone connected with the art would readily realize, a tapped delay line would be required at this point to compensate for any differential delay between the delay line demodulator and the coherent demodulator encoded output.

The delay line demodulator 4, which may be of conventional design, affords rapid signal acquisition since no phase-lock-loop operation is employed, the coherent reference being derived directly from the received signal through a one word length, or 1 bit, delay line. Since there is no requirement for phase-lock operation, Doppler uncertainty imposes no problem as to acquisition. The major disadvantage of the delay line demodulator, however, results from the necessity to use the preceding phase state of the transmitted signal, as received, as the coherent reference for a currently received signal. Recognizing that the received signal is a noisy reference, error performance of the delay line demodulator can be no better than 2.5 dB less than that theoretically possible for a coherent detector.

In accordance with the invention, however, the output of the delay line demodulator 4 is employed for reconstruction of the carrier frequency and not directly as the demodulated I and Q (inphase and quadrature) channel signals. In reconstruction of the carrier, the I and Q channel information from the delay line demodulator 4 is encoded in encoder 5 according to the following logic equations:

$$I' = I\bar{Q}A_n + IQB_n + \bar{I}\,\bar{Q}\,\bar{A} + \bar{I}Q\bar{B}_n \quad (1)$$

$$Q' = IQB_n + I\overline{QA}_n + \bar{I}\,\bar{Q}\,\bar{B}_n + \bar{I}QA_n \quad (2)$$

where $I'$=the differentially encoded version of I $Q'$=the differentially encoded version of Q I=the delay line demodulator output I Q=the delay line demodulator output Q $A_n$=the previous state output of the encoder corresponding to $I'$ $B_n$=the previous state output of the encoder corresponding to $Q'$ The encoder can be constructed of passive elements (gates and video delay lines) instead of clocked logic elements so that the acquisition time of bit sync 51 does not impact on the overall acquisition time of the coherent detector. The I' and Q' signals from encoder 5 are supplied through gate 6 to correlators 7 and 8, respectively, according to the state of the acquisition (ACQ) input signal at terminal 9. The ACQ input initially enables gate 6 to pass the I' and Q' signals to mixers 7 and 8, respectively; correspondingly, the signal paths for the additional signals I' and Q' at terminals 10 and 11 are blocked initially. The source of the additional signals I' and Q' and their use when gate 6 is enabled with respect thereto is discussed hereafter in connection with the phase detector circuitry.

The received signal from limiter 2 also is supplied to amplifier 14 and the output thereof is split into quadrature components by hybrid element 15. Mixers 7 and 8 comprise a balanced mixer such that when the received signal is mixed with the I' and Q' signals by elements 7 and 8, respectively, and their respective outputs are summed in element 16, all modulation components of the received signal are removed, the output of summer 16 thereby comprising the reconstructed, and theretofore suppressed, carrier. The reconstructed carrier from summer 16 is employed in three separate circuits to derive an AGC voltage, an intermediate frequency (IF) and a coherent phase reference.

Specifically, the output of summer 16 is detected by energy detector 20 to derive a voltage proportional to the received signal amplitude for AGC input to IF amplifier 1. It is significant to note that the energy detector 20 may be, and desirably is, of narrow bandwidth design, since it need process only the single frequency of the reconstructed carrier. The energy detector 20 accordingly may be of conventional design, greatly simplifying and reducing the cost of providing AGC in the system of the invention, relative to prior art systems which do not reconstruct the carrier from the received signal.

The summer 16 is buffered in amplifier 21 and made input to mixer 22 which also receives the output frequency signal from a stable local oscillator (LO) 23.

The output of mixer 22 is then a convenient intermediate frequency having a frequency uncertainty limited by conditions of doppler shifting and variations at the transmitter.

To facilitate the acquisition of the reconstructed carrier frequency and particularly to minimize time for frequency acquisition of the received signal, filter bank 24 is provided, comprising a number of discrete filter elements of differing center frequencies and generally equal bandwidth, the totality of which cover the total bandwidth of frequency uncertainty of a reconstructed carrier, as converted to IF by mixer 22. Associated with the filters of the bank 24 are suitable energy detectors and associated logic for identifying the frequency of a signal causing an output to be produced from a given filter. According to the detection of the carrier frequency within a given filter element, suitable logic circuitry provides an output to frequency synthesizer 25 which in turn generates a prescribed frequency corresponding to the actual carrier frequency of the received signal, as reconstructed, for input to mixer 26.

Mixer 26 receives also the reconstructed carrier signal, buffered through amplifier 27, and produces at its output only the difference in frequency between the reconstructed carrier and the synthesized frequency. The output of mixer 26 drives a phase-lock-loop (PLL) 28 which provides phase corrections, or a reference carrier, to the coherent phase detector circuits, and a voltage level identified in FIG. 1 at 9′ as ACQ INDICATION, indicating acquisition of the carrier frequency has been achieved.

Figure 2:
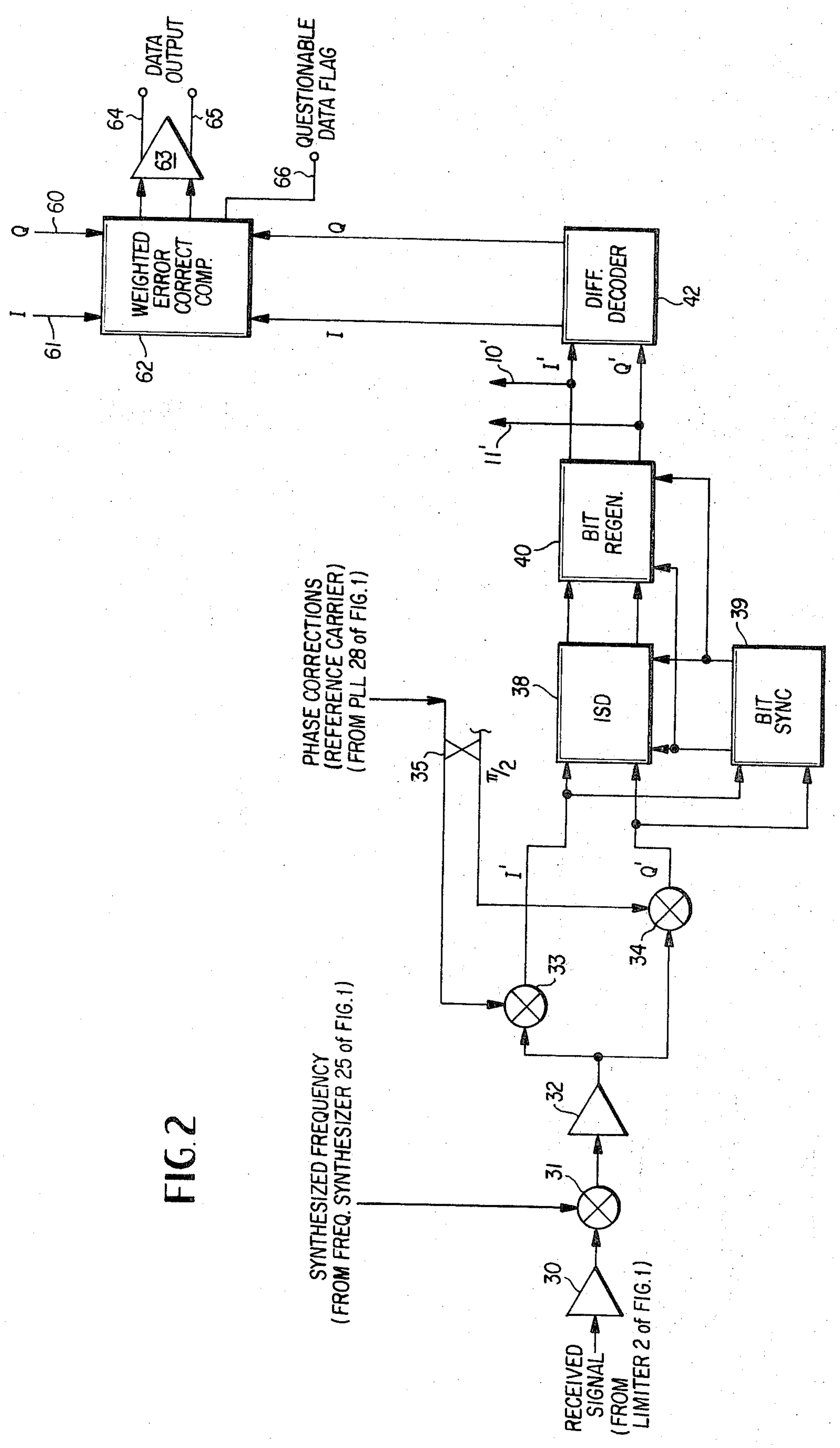
FIG. 2 is a block diagram illustrating the remaining portion of the quadriphase demodulator of the invention and including, generally, the coherent phase detector and the component for performing weighting and comparison of I and Q data channel outputs.

The requirement for coherent detection is that a frequency be mixed with the received signal both in proper frequency and phase relationship to the original carrier frequency at the transmitter. Referring to FIG. 2, the received signal (from limiter 2 of FIG. 1) is buffered in amplifier 30 and mixed in mixer 31 with the SYNTHESIZED FREQUENCY output of the frequency synthesizer 25 of FIG. 1. At this point in the signal processing, the received signal has been coherently mixed. This mixing results in a translation of the received carrier and signal sidebands to a center frequency that is the same frequency and has the same phase relationship as the reference carrier from the phase-lock-loop 28. This output is buffered by amplifier 32 and sent to a balanced demodulator. The balanced demodulator consists of quadrature hybrid element 35 and mixer elements (detector diodes) 33 and 34. The in-phase component from the hybrid 35 and mixer 33 provide in-phase detection of received signal, I′. The quadrature component from the hybrid 35 and mixer 34 provide quadrature detection of the received signal, Q′. As a result, coherent demodulation of the received signal is achieved.

To recover and I and Q data with optimum error performance, and particularly in the presence of noise, signal processing is performed on the I and Q data streams, consisting of clock regeneration, of integrate, sample and dump, and of bit regeneration. Clock regeneration is accomplished in bit sync component 39 of FIG. 2; in view of the use which may be made of the outputs of the delay line demodulator of FIG. 1 as a redundant data, clock regeneration similarly is performed by bit sync component 51 of FIG. 1. A state of the art technique is employed which uses the binary transitions, or zero crossings, of each of the I and Q data signals to generate a corresponding bit clocking rate separately for I and Q bit synchronization. The I and Q bit sync rates exhibit the same rate but are time delayed, one relatively to the other, by 90°, as is appropriate for the I and Q quadrature relationship.

During the bit period established by the bit sync component 39, the ISD (integrate, sample and dump) component 38 in FIG. 2, and similarly ISD component 50 in FIG. 1, is employed in a state of the art manner to measure the state of the data bit (i.e., a logical 1 or 0). For example, at the start of the bit sync pulse, integration is performed on the incoming I or Q signal, and just prior to receipt of the next bit sync pulse a sample is made of the voltage level achieved during integration. The voltage level is made input to the bit regeneration component 40 in FIG. 2 and, similarly, to component 52 in FIG. 1. The dump function of the ISD component also takes place before the next bit sync pulse to reset the integrator in preparation for operation during next sequential bit period. The bit regeneration component receives timing signals corresponding to the bit synchronization rate for component 39, for example, and produces an output bit stream for the I′ and Q′ channels in the case of FIG. 2, and the I and Q channels in the case of FIG. 1. The distinction of primed and uprimed channels is discussed subsequently. In the usual manner, the bit regeneration component measures the voltage received from the ISD component and assigns a logical 1 state above a given voltage level and a logical 0 state below that voltage level.

The coherent phase detector circuitry discussed above functions to demodulate directly the differentially encoded signal, as received. In order to obtain the intelligence modulation, however, the I′ and Q′ channels of information must be differentially decoded in a logical procedure equivalent to that of equations 1 and 2. The differential decoder 42 is employed for this purpose and has as its output the I and Q channels of information. The I′ and Q′ signals, as obtained at outputs 10′ and 11′, respectively, and thus prior to differential decoding, are precisely those required to sustain the reconstruction of the transmitter carrier as discussed previously in connection with FIG. 1. Referring then to FIG. 1, gate 6 responds to the ACQ input at terminal 9 to switch from the outputs of encoder 5 to the I′ and Q′ signals on inputs 10 and 11 when the ACQ signals that the correct carrier frequency and phase have been reconstructed, as determined by the phase-lock-loop component 28.

To obtain maximum advantage from the two distinctly different signal processors embodied in the invention, namely the delay line demodulator and the coherent phase detector, the bit regeneration components 52, 51, and 50 associated with the delay line demodulator in FIG. 1, are used also to provide optimal I and Q data bit streams on outputs 60 and 61, respectively. It is noted that the bit regeneration circuitry 50, 51 and 52 operates on I and Q channel data directly, as is afforded by the output of a delay line demodulator; by contrast, the phase detector circuitry operates on I′ and Q′ data, and thus differential decoder 42 is required to provide I and Q data from the coherent phase detector outputs. The output of bit regenerator component 52 thus is directly compatible with the output of differential decoder component 42. (Correspondingly, the I and Q data from the delay line demodulator must be processed in encoder 5 for supply to gate 6, whereas the I′ and Q′ outputs of the coherent detector may be supplied directly to gate 6 for use in the correlation function in reconstructing the carrier, in FIG. 1). Weighted error correction component 62 receives the I and Q channel data bit streams of the two data sources and suitably weights and compares the separate logic states thereof to produce a resultant output exceeding the error performance of either of the data sources, taken separately, (i.e., the delay line demodulator and the coheret phase detector). The weighted error correction component 62 also may issue a flagging signal 66 whenever a discrepancy is detected in the two data source inputs.

To complete the circuit, amplifier 63 provides data outputs 64 and 65 corresponding to the I and Q channels of bit independent data bit streams comprising the original data modulation of the received differentially encoded, quadriphase transmission.

Numerous modifications and adaptations of the system of the invention will be apparent to those skilled in the art and thus it it intended by the appended claims to cover all such modifications and adaptations which fall within the true spirit and scope of the invention.

What is claimed is:

1. A system for coherently demodulating suppressed carrier, differentially encoded quadriphase signals, comprising:

first demodulating means for demodulating a received, differentially encoded quadrature signal and producing in-phase channel and quadrature phase channel outputs corresponding to the in-phase channel and quadrature-phase channel modulation components of the received signal, means receiving the received signal and producing separate quadrature-related components of the received signal, correlating means receiving said separate quadrature-related components of the received signal and the in-phase channel and quadrature-phase channel outputs of said first demodulating means for modulating the said separate quadraturereleated components of the received signal with corresponding ones of the in-phase and quadrature-phase channel outputs, thereby to remove the modulation components from, and reconstruct the carrier of, the received signal, means for acquiring the frequency and phase of the reconstructed carrier and generating a reference carrier correlated in phase and frequency with the reconstructed carrier, and means responsive to the reference carrier and the received signal for coherently demodulating the received signal, thereby to produce as outputs the in-phase channel and quadrature-phase channel modulation components thereof.

2. A system as recited in claim 1 wherein said first demodulating means provides differentially decoded, bit independent data bit streams as the in-phase channel and quadrature-phase channel outputs thereof, and there is further provided means for differentially encoding the independent data bit streams of the in-phase channel and quadrature-phase channel outputs of said first demodulating means, and said correlating means receives the differentially encoded in-phase channel and quadrature-phase channel output of said differential encoding means for modulating the corresponding, quadraturerelated components of the received signal.

3. A system as recited in claim 1 wherein the outputs of said coherent demodulating means are differentially encoded, and there is further provided decoding means for receiving and differentially decoding the outputs of said coherent demodulation means to produce as outputs thereof, bit independent data bit streams corresponding to the in-phase channel and quadrature-phase channel modulation components of the received signal.

4. A system as recited in claim 1 wherein said first demodulating means comprises a delay line demodulator.

5. A system as recited in claim 1 wherein:

said correlating means comprises a quadriphase modulator.

6. A system as recited in claim 5 wherein said quadriphase modulator comprises:

first and second mixing means respectively receiving corresponding one of said quadrature-related components of the received signal, and of the in-phase channel and quadrature-phase channel outputs of said first demodulating means, and means for summing the outputs of said first and second mixing means to produce the reconstructed carrier.

7. A system as recited in claim 1 wherein said phase and frequency acquiring and reference carrier generating means comprises:

means defining a plurality of contiguous bandwidths of differing center frequencies encompassing the total bandwidth uncertainty of a reconstructed carrier, said defining means receiving the reconstructed carrier and providing an output identifying the frequency of the reconstructed carrier as a predetermined frequency within one of said plurality of contiguous bandwidths thereof, means for generating a synthesized frequency signal in accordance with the predetermined frequency of the bandwidth identification of the frequency of the reconstructrd carrier as produced by said bandwidth defining means, means for mixing the synthesized frrequency signal of said generating means and the reconstructed carrier, and producing an output, and a phase-lock-loop receiving the output of said mixing means and generating the said reference carrier.

8. A system as recited in claim 1 wherein said frequency and phase acquiring and reference carrier generating means comprises:

a bank of plural filters of differing center frequencies and contiguous bandwidths encompassing the totality of the bandwidth of frequency uncertainty of a reconstructed carrier, for receiving a reconstructed carrier and supplying an output from one of said filters in accordance with frequency of the reconstructed carrier, frequency synthesizer means having a store of predetermined frequencies respectively corresponding to the center frequencies of said filters, and responsive to an output from one of said filters of said filter bank for producing as an output signal the respectively corresponding, synthesized frequency, and mixing means for receiving and mixing the synthesized frequency output signal and the reconstructed carrier, and a phase-lock-loop receiving the output of said mixing means and generating the reference carrier.

9. A system as recited in claim 1 wherein said coherent demodulating means comprises a coherent phase detector.

10. A system as recited in claim 9 wherein said frequency and phase acquiring and reference carrier generating means comprises:

means for identifying the frequency of the reconstructed carrier as within a predetermined bandwidth portion of a total bandwidth encompassing the frequency uncertainty of a reconstructed carrier, and for generating a synthesized frequency corresponding to the identified frequency of the reconstructed carrier, means for mixing the synthesized frequency and the reconstructed carrier, and a phase-lock-loop for receiving the mixed synthesized frequency and reconstructed carrier signals for acquiring the phase of the reconstructed carrier and generating the reference carrier correlated in phase and frequency with the reconstructed carrier, and wherein said coherent phase detector includes further mixing means for mixing the received signal and said synthesized frequency signal, and additional first and second mixing means each receiving the output of said further mixing means and respectively receiving quadrature related components of said reference carrier phase correction signals to produce corresponding, coherently demodulated outputs of the in-phase channel and quadrature-phase channel data.

11. A system as recited in claim 2 wherein there is further provided:

gating means receiving as first inputs thereto the in-phase channel and quadrature-phase channel components derived by said encoding means, and as second inputs thereto, the quadrature related in-phase channel and quadrature-phase channel components of said coherent demodulating means, and normally gating said first inputs to said correlating means, and being operable for selectively gating said second inputs to said correlating means, and said phase acquisition means, upon attaining phase acquisition, control said gating means to switch from said normal gating to said selective gating for supplying the in-phase channel and quadrature-phase channel components produced by said coherent demodulating means to said correlating means.

12. A system as recited in claim 1 wherein there is further provided detector means receiving the reconstructed carrier from said correlating means and providing an automatic gain control output in accordance with the energy level of the reconstructed carrier.

13, A system as recited in claim 1 wherein there is further provided means for receiving the in-phase channel and quadrature-phase channel components of the received signal as derived respectively by said first demodulating means and by said coherent demodulating means for selective weighting and comparison thereof to afford in-phase channel and quarature-phase channel data outputs of enhanced accuracy.

14. A system as recited in claim 13 wherein said weighting and comparison means further provides an output identifying as questionable data any data bit output as to which there is disagreement between corresponding data bits as derived by said first demodulating means and said coherent demodulating means.

15. A system as recited in claim 1 wherein there is further provided means responsive to the quadrature-phase channel outputs of said coherent demodulating means to perform clock regeneration, integrate, sample and dump operations and bit regeneration to afford optimum error performance.

16. A system for coherently demodulating differentially encoded quadriphase signals having a suppressed carrier, comprising a delay line demodulator responsive to a received, differentially encoded quadrature signal for producing as outputs, in quadrature-related channels, the bit-independent data bit streams of the original data modulation, means for differentially encoding the data bit streams of each of the quadrature-related channel outputs of said delay line demodulator, means responsive to the received signal for supplying as otuput signals, quadrature-related components of the received signals, a quadriphase modulator having first and second signal paths respectively receiving the output signals of said supplying means comprising the quadrature-related components of the received signal, and corresponding ones of the differentially encoded data bit streams of the quadrature-related channel outputs of said delay line demodulator, said quadriphase modulator modulating the signals in each path with the corresponding bit stream, and means for combining the modulated output of each path for reconstructing the carrier of the received signal and supplying the reconstructed carrier as an output, means for acquiring the phase and frequency of the reconstructed carrier and producing a reference carrier correlated in phase with the reconstructed carrier, means receiving the reference carrier and producing as outputs quadrature-related components thereof, and a coherent phase detector having first and second signal paths each receiving therein the received signal and a corresponding one of the quadrature-related components of the reference carrier, and mixing the corresponding quadrature components of the reference carrier with the received signal and producing coherently demodulated quadrature-related data bit stream outputs from the respective paths.

17. A system as recited in claim 16 further comprising means for differentially decoding the quadrature-related outputs of said coherent phase detector to produce bit-independent data bit streams as the respective quadrature-related outputs.

18. A system as recited in claim 17 wherein there is further provided gating means having, as first inputs thereto, the quadrature-related outputs of said encoding means and, as second inputs thereto, the quadrature-related outputs of said coherent phase detector, said phase and frequency acquisition means providing an acquisition indication output, and said gating means normally connecting said first inputs thereof to said quadriphase modulator and being responsive to said acquisition indication to selectively switch from said first inputs to said second inputs thereof for connection to said quadriphase modulator.

19. A system as recited in claim 16 wherein said phase and frequency acquiring and reference carrier generating means comprises:

a bank of filters and means for heterodyning the reconstructed carrier for supply thereof at a lower frequency within the range of frequencies of said filter bank, said filter bank encompassing within the range of frequencies thereof the entire bandwidth of frequency uncertainty of the heterodyned reconstructed carrier, and identifying the frequency of the heterodyned reconstructed carrier within one of a plurality of limited frequency bandwidths of differing center frequencies within the said range of frequencies of the filter bank, frequency synthesizer means for generating a synthesized frequency signal corresponding to the frequency of the reconstructed carrier as identified by an output of said filter bank, a phase-lock-loop, and means for mixing said synthesized frequency and said reconstructed carrier for supply of the mixed signal output thereof to said phase-lock-loop, said phase-lock-loop producing said reference carrier correlated in phase and frequency with the reconstructed carrier, and wherein said coherent phase detector further comprises further mixing means for mixing the received signal with the synthesized frequency and supplying the mixed signal to the first and second signal paths thereof, said signal paths respectively including mixing means for receiving corresponding quadrature-related components of the reference carrier output of said phase-lock-loop and producing the quadrature-related and coherently demodulated data bit stream outputs.

* * * * *